(12) United States Patent
Stauffer

(10) Patent No.: US 8,932,753 B2
(45) Date of Patent: Jan. 13, 2015

(54) LEAD ALKALINE BATTERY

(71) Applicant: John E. Stauffer, Greenwich, CT (US)

(72) Inventor: John E. Stauffer, Greenwich, CT (US)

( * ) Notice: Subject to any disclaimer, the term of this patent is extended or adjusted under 35 U.S.C. 154(b) by 0 days.

(21) Appl. No.: 14/032,540

(22) Filed: Sep. 20, 2013

(65) Prior Publication Data

US 2014/0023918 A1      Jan. 23, 2014

Related U.S. Application Data

(63) Continuation of application No. 13/299,482, filed on Nov. 18, 2011, now abandoned, which is a continuation-in-part of application No. 12/410,500, filed on Mar. 25, 2009, now abandoned, which is a continuation-in-part of application No. 11/167,535, filed on Jun. 27, 2005, now Pat. No. 7,947,391, which is a continuation-in-part of application No. 10/758,015, filed on Jan. 16, 2004, now Pat. No. 6,982,428.

(51) Int. Cl.
| | | |
|---|---|---|
| *H01M 10/26* | (2006.01) | |
| *H01M 6/04* | (2006.01) | |
| *H01M 10/22* | (2006.01) | |
| *H01M 4/38* | (2006.01) | |
| *H01M 4/42* | (2006.01) | |
| *H01M 4/56* | (2006.01) | |
| *H01M 10/20* | (2006.01) | |
| *H01M 10/24* | (2006.01) | |

(52) U.S. Cl.
CPC ............... *H01M 10/22* (2013.01); *H01M 4/38* (2013.01); *H01M 4/42* (2013.01); *H01M 4/56* (2013.01); *H01M 10/20* (2013.01); *H01M 10/24* (2013.01); *H01M 10/26* (2013.01); *H01M 2300/0014* (2013.01); *Y02E 60/124* (2013.01)
USPC .......................................................... 429/207

(58) Field of Classification Search
USPC ......... 429/203, 206, 207, 221, 222, 223, 225, 429/228, 229
See application file for complete search history.

(56) References Cited

U.S. PATENT DOCUMENTS

| | | | |
|---|---|---|---|
| 1,955,115 A | 4/1934 | Drumm | |
| 3,009,007 A | 11/1961 | Bryant, Jr. | |
| 3,833,427 A * | 9/1974 | Land et al. ................... | 429/153 |
| 3,862,861 A | 1/1975 | McClelland et al. | |
| 3,925,171 A * | 12/1975 | Jargon et al. ................. | 205/319 |
| 4,076,909 A | 2/1978 | Lindstrom | |

(Continued)

FOREIGN PATENT DOCUMENTS

EP        155710 A1      7/2005

OTHER PUBLICATIONS

Linden, D., Handbook of Batteries, Second Edition, p. 35.17, McGraw-Hill, Inc.

(Continued)

*Primary Examiner* — Muhammad Siddiquee
(74) *Attorney, Agent, or Firm* — Young Basile Hanlon & MacFarlane PC

(57) ABSTRACT

A rechargeable battery is provided such that the positive electrode comprises lead dioxide, the negative electrode comprises a metal selected from the group consisting of iron, zinc, cadmium, lanthanum/nickel alloys and titanium/zirconium alloys, and the electrolyte is an aqueous alkali-metal acetate. Upon discharge, the lead dioxide is reduced to lead oxide, and the electrolyte remains unchanged. The reactions are reversed when the battery is charged.

3 Claims, 1 Drawing Sheet

(56) References Cited

U.S. PATENT DOCUMENTS

| | | | |
|---|---|---|---|
| 4,268,589 A | | 5/1981 | Tamminen |
| 4,362,791 A | * | 12/1982 | Kaneko et al. ............... 429/101 |
| 4,451,543 A | | 5/1984 | Dzieciuch et al. |
| 5,599,637 A | | 2/1997 | Pecherer et al. |
| 6,203,939 B1 | | 3/2001 | Wilson |
| 2003/0070910 A1 | | 4/2003 | Otsuka et al. |
| 2003/0140483 A1 | | 7/2003 | Wakabayashi et al. |
| 2004/0053124 A1 | | 3/2004 | LaFollette et al. |
| 2008/0052898 A1 | | 3/2008 | Visco et al. |

OTHER PUBLICATIONS

Kirk-Othmer Encyclopedia of Chemical Technology, vol. 6. Chromium Compounds, p. 103.

M.L.B. Rao., Investigations of an Alkaline Electrolyte for Zn-PbO2 Cells, J. Electrochem Soc.: Electrochemical Science and Technology vol. 120, No. 7, Jul. 1973, pp. 855-857.

European Search Report dated Sep. 1, 2009 corresponding to European Patent Application No. 06785248.3 based on PCT/US2006/024088.

\* cited by examiner

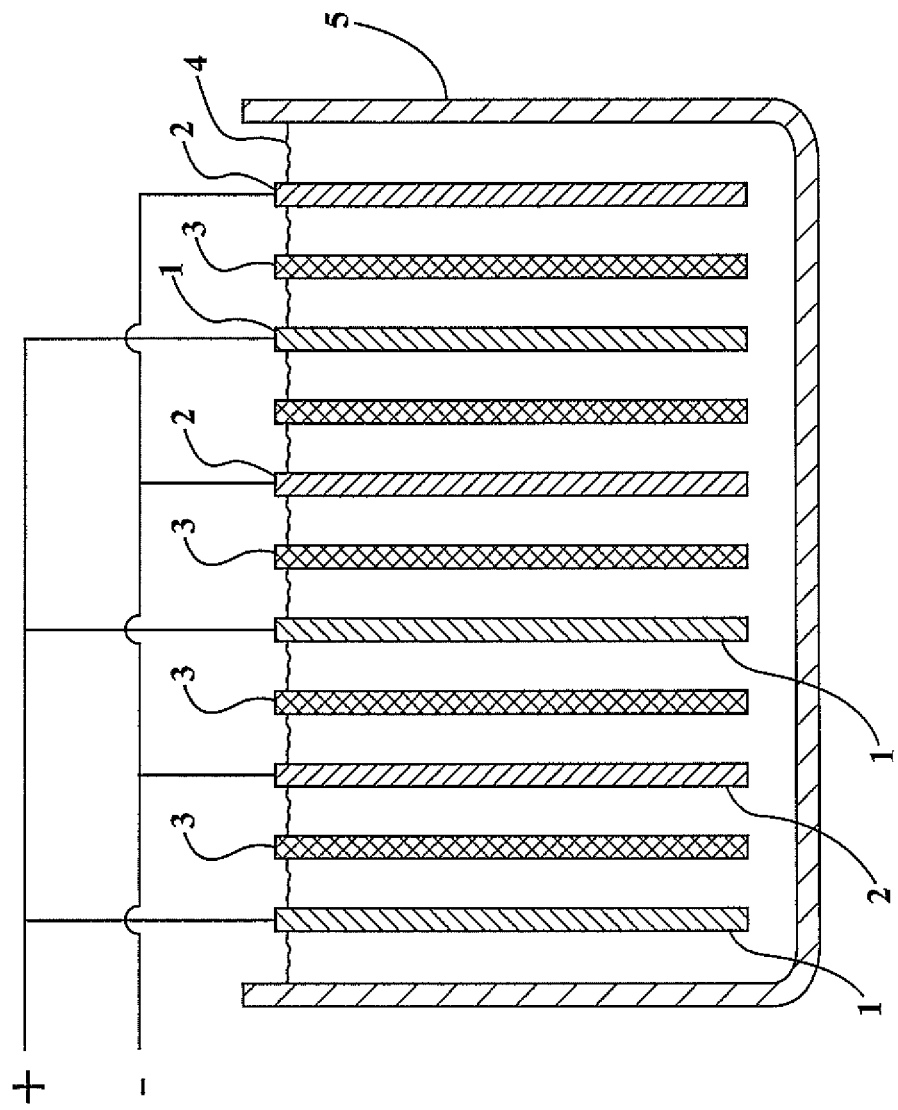

LEAD ALKALINE BATTERY

CROSS-REFERENCE TO RELATED APPLICATION

This application is a continuation-in-part of application Ser. No. 13/299,482, filed on Nov. 18, 2011, which is a continuation-in-part of application Ser. No. 12/410,500, now abandoned, which is a continuation-in-part of application Ser. No. 11/167,535, filed on Jun. 27, 2005, now U.S. Pat. No. 7,947,391, which is a continuation-in-part of application Ser. No. 10/756,015, filed on Jan. 13, 2004.

FIELD OF THE INVENTION

The present invention relates to a novel type of storage battery which is distinguished by its unique electrochemistry. In the charged condition, the positive electrode comprises lead dioxide and the negative electrode comprises a metal or a metal alloy.

BACKGROUND OF THE INVENTION

The most common storage battery, found in almost every vehicle, is the lead-acid battery. This battery comprises a lead dioxide positive electrode, a lead metal negative electrode, and sulfuric acid for the electrolyte. Its chief advantage is low cost. Nevertheless, it has a limited energy density and the electrolyte is extremely corrosive. Furthermore, sufficient acid is required to react with the electrodes during discharge. Maintenance-free types avoid the loss of evolved gases, as disclosed in U.S. Pat. No. 3,862,861, but their cycle-life is still restricted.

The search for alternatives to the lead-acid battery has been ongoing. As far back as 1934, Drumm disclosed the nickel-oxide zinc battery and the silver oxide-zinc battery (U.S. Pat. No. 1,955,115). Both of these batteries employ zinc as the negative electrode and caustic potash as the electrolyte. Nickel oxide or silver oxide serves as the positive electrode. These batteries have improved energy densities and for many uses are a good compromise.

The ideal storage battery would combine the best features of existing batteries with none of the drawbacks. The need for such a battery is apparent for backup systems and in mobile applications. Therefore, it is an object of the present invention to provide an improved storage battery, one that is both economical and highly efficient. These and other objects, features, and advantages of the invention will be recognized from the following description and accompanying FIGURE.

SUMMARY OF THE DISCLOSURE

A rechargeable battery has been developed in which the positive electrode comprises lead dioxide in the charged condition, a negative electrode of metal or an alloy of metals, and an aqueous electrolyte comprising an alkali metal acetate. Upon discharge, the lead dioxide is reduced to lead oxide and the metal is oxidized to an oxide. These reactions are reversed when the battery is charged.

The negative electrode can be a metal selected from the group consisting of iron, zinc, cadmium, lanthanum/nickel and titanium/zirconium alloys.

The electrolyte of the cell is alkaline. Aqueous solutions of bases provide the alkalinity. The preferred electrolyte uses an alkali metal acetate prepared from a weak acid and a strong base such as an alkali metal hydroxide. These compounds readily dissolve in water to form solutions with superior electrical conductivities. The concentration of acetate in the electrolyte is preferably between about 20 and 45 percent.

Other solutions can be considered for the electrolyte as well. These include carbonates, borates, silicates, phosphates and sulfates. They may be introduced by the corresponding acids or their respective salts.

The electrodes of a practical embodiment of the invention may be configured as sheets, fibers, or particles thereby to maximize electrode surface area. Interspersed particles of a carbonaceous material may be used to improve the electrical conductivity. A gelling agent may be added to immobilize the electrolyte. As required, a separator may be employed between the positive and negative electrodes to prevent a short circuit.

WRITTEN DESCRIPTION

The chemistry of the lead-alkaline battery is important in order to gain an understanding of its operation. A positive electrode initially made of lead becomes lead dioxide when changed which is reduced to lead oxide during discharge. In the case where the negative electrode comprises, for example, zinc, this metal is oxidized to zinc oxide when the cell is discharged. The electrolyte is alkaline such that the solution contains an excess of hydroxyl ions. The electrode reactions during discharge can be represented by the following equations:

Positive Electrode:

$$PbO_2+H_2O+2e^- \rightarrow PbO+2OH^- \quad (1)$$

Negative Electrode $$Zn+2OH^- \rightarrow ZnO+H_2O+2e^- \quad (2)$$

In the above reaction, zinc hydroxide may be an intermediate in the formation of zinc oxide. When these equations are combined, the reaction for the cell is:

$$PbO_2+Zn \rightarrow PbO+ZnO \quad (3)$$

In the overall reaction, there is no change in the average composition of the electrolyte during discharge although there may be concentration gradients.

During recharging of the cell, the reactions are reversed. Thus, lead oxide is oxidized to lead dioxide and zinc oxide is reduced to zinc metal. The emf necessary for charging is supplied by an external power source. The discharge-recharge cycle can be repeated endlessly, thus fulfilling the function of a storage battery.

A particularly difficult challenge in designing new batteries is identifying electrode materials that will undergo electrochemical reactions and still withstand corrosion by the electrolyte. Although theory is helpful in this respect, empirical data are required to prove the effectiveness of materials—both for the electrodes and the electrolyte. One measure of the relative performance of a cell is its open-circuit voltage. Another consideration is cycle life.

Zinc is used as an example of a negative electrode that can be used with the lead positive electrode and the electrolyte described herein. However, other materials can be used for the negative electrode, including but not limited to iron, lead, cadmium and metal hydrides. Metal hydrides are materials that comprise certain alloys that on charging absorb atomic hydrogen to form the metal hydride. At least two classes of alloys are suitable to form metal hydrides. One group of alloys is based on rare earths and generally consists of a lanthanum-nickel blend. A second group of alloys is made of a titanium-zirconium composition. The negative electrodes herein are provided by way of example and are not meant to be limiting. It is contemplated that other alloys can be used as a negative electrode in the battery embodiments disclosed herein.

The use of lead in an alkaline cell may seem questionable because lead in the +2 oxidation state commonly forms plumbous salts containing the positive divalent ion $Pb^{++}$. However, by the action of hydroxides on plumbous compounds it is possible to the negative ion $HPbO_2^-$ which is soluble in aqueous solutions. Accordingly, $Pb(OH)_2$ is regarded as an amphoteric hydroxide. In a similar manner, concentrated solutions of alkali hydroxides act upon the dioxide $PbO_2$ to form plumbate ions, $PbO_4^{-4}$ and $PbO_3^{-2}$, which are likewise soluble.

In view of these considerations, one goal of the research on new cells was to control the concentration hydroxides in the electrolyte. This result was made possible by employing solutions of sodium carbonate which react as follows:

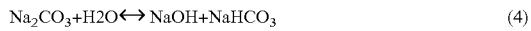

$$Na_2CO_3 + H_2O \leftrightarrow NaOH + NaHCO_3 \quad (4)$$

From this equation it is seen that such solutions are strongly alkaline. The carbonic acid set free on hydrolysis does not escape when the base is strong but forms the bicarbonate. However, hydrolysis can be reduced by increasing the concentration of the sodium carbonate, thus permitting a degree of control over the formation of hydroxide.

In place of carbonates, borates can be employed to similar advantage. Boric acid is a weak acid, much more mild than carbonic acid. Thus, its salts tend to hydrolyze in solution. The following equation shows the reaction of potassium meta borate in solution to form potassium hydroxide and potassium tetra borate.

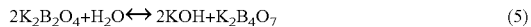

$$2K_2B_2O_4 + H_2O \leftrightarrow 2KOH + K_2B_4O_7 \quad (5)$$

Again the hydroxyl concentration can be controlled by adjusting the concentration of the potassium borate.

Carbonates and borates are effective not only in controlling the alkalinity of the electrolyte, but they also form insoluble salts with lead. In this manner the corrosion of the positive electrode can be minimized. Not only are carbonates and borates helpful in this regard, but other salts are likewise effective. Silicates, phosphates and sulfates form insoluble salts with lead.

The favored electrolyte in the present invention is an aqueous solution of an alkali metal acetate. Acetic acid is a stronger acid than either carbonic acid or boric acid, but its salts are still alkaline in solution. Consistent with the technology for secondary batteries, the concentration of acetate in the electrolyte is between 20 and 45 percent. This concentration assures that the electrolyte has a high ionic conductivity, thus providing superior battery performance.

Alkalinity can be provided by compounds of the alkali metals including lithium, sodium, potassium, and cesium. Lithium has certain limitations inasmuch as its carbonate and phosphate are almost insoluble in water. Cesium provides a very strong base but the cost of this material limits its potential applications. While ammonium hydroxide is basic in solution, its volatility restricts its use. Finally, tetramethyl ammonium hydroxide is known to be strongly alkaline, approaching that of sodium hydroxide and potassium hydroxide.

The present invention covers the use of aqueous solutions for the electrolyte. These solutions have the advantage of superior electrical conductivities. Although use of organic solvents including alcohols and glycols is feasible, their performance is inferior.

The configuration of a lead-alkaline cell is not restricted. For purposes of testing various combinations of electrodes and electrolytes, a simple cell was assembled from a glass jar and strips of metal separated, as need be, by a polypropylene sheet. A workable battery, however, would necessarily be designed with the maximum surface areas for the electrodes and minimum volume of electrolyte. Such geometric designs as parallel plates, either flat or spirally wound, are appropriate. Alternatively, particles of lead and metal either alone or interspersed with graphite may be employed. In this manner, the capacity of the cell can be increased and its internal resistance minimized.

To gain a greater appreciation of the present invention, FIG. 1 illustrates its distinctive features. The cut-away perspective shows a lead-zinc battery comprising a single cell with its electrodes arranged as flat parallel plates. The lead dioxide positive electrodes 1 and the zinc negative electrodes 2 are kept apart by separators 3. These parts are immersed in the alkaline electrolyte 4, which is contained in casing 5. This sectional view also shows the electrical leads attached to the electrodes. An advantage of this design is that by placing the positive and negative electrodes in close proximity to each other the quantity of electrolyte is reduced.

Applications of a secondary battery as provided by the present invention are almost limitless. The largest application is in vehicles including automobiles powered by new hybrid motors. Other uses include portable electronic devices such as cell phones and laptop computers.

Example No. 1

The electrolyte was prepared by heating 100.0 gm. of potassium bicarbonate in an oven to convert it to potassium carbonate, which was then dissolved in 185 ml. of water. The positive electrode was formed from a 1½ in. wide strip of lead and the negative electrode was a 1½ in. wide strip of steel. The cell comprised a glass jar about 2¾ in. diameter by 2½ in. high. After charging the cell at 2.5 volts for 21 minutes an open circuit potential of 1.7 volts was observed. At the end of the run both electrodes were in good condition and the electrolyte was water-white.

Example No. 2

The electrolyte was prepared by heating 106.3 gm. of sodium bicarbonate in an oven to convert it to sodium carbonate, which was dissolved in 250 ml. of water and 10 ml. of concentrated sulfuric acid. Two strips of lead 2 in. wide were used for the positive and negative electrodes. The cell comprised a glass jar 2½ in. diameter by 4 in. high. After charging the cell at 2.4 volts for 9 minutes an open circuit potential of 1.5 volts was observed. Both electrodes were dimensionally stable.

Example No. 3

The same cell was used as in Example 2, but 3.7 gm. of sodium hydroxide pellets were added to the electrolyte. Also, a zinc electrode was substituted for the negative lead electrode. After charging the cell at 2.5 volts for 3 minutes an open circuit of 2.1 volts was obtained. The electrodes remained in excellent condition after repeat cycling.

Example No. 4

A cell fashioned from a glass jar 1.75 in. in diameter by 3.5 in. high. The positive electrode was a strip of lead 1.5 in. wide by 4 in. long. The negative electrode was a sheet of zinc 1.5 in. wide by 4 in. long. The electrolyte was prepared by neutralizing sodium bicarbonate (baking soda) with white vinegar of 5% acidity (acetic acid). Vinegar was added to 78.8 gm. of sodium bicarbonate until foaming stopped and the solution was clear. The resulting solution was boiled down to 350 ml. After charging the cell for 15 minutes at 3.0 volts, a cell potential of 2.1 volts was realized. Upon discharging the cell, a flashlight bulb was lit brightly with a current of 85 milliamps. The cell was repeatedly cycled. At the end of the run, both electrodes were in excellent condition.

In summary, the present invention provides for the use of a buffer in the electrolyte of a storage battery. As noted in the prior applications, the use of a buffer helps to control the pH of the electrolyte thereby minimizing the corrosion of the electrodes.

Alkali metal acetates are known to be effective buffers (The Merck Index, 11$^{th}$ Ed., p. 1355). They are prepared from a weak acid (acetic acid) and a strong base (alkali metal hydroxide). These compounds readily dissolve in water to form solutions that have superior electrical conductivities.

A cell per Example No. 3 can be constructed using cadmium as the negative electrode.

What is claimed is:

1. A storage battery comprising:
   a. a positive electrode which exists as lead dioxide in the charged condition,
   b. a negative electrode of metal, and
   c. an alkaline electrolyte consisting of an aqueous solution of an alkali metal acetate with a concentration in the range of 20 to 45 percent.

2. A storage battery of claim 1 in which the metal is selected from the group consisting of iron, zinc, cadmium, lanthanum/nickel, and titanium/zirconium alloy.

3. A storage battery of claim 1 in which the alkali metal is selected from the group lithium, sodium, potassium, rubidium, and cesium.

* * * * *